Dec. 21, 1965     M. DZVONIK     3,224,232
INSTANT FLARE DEVICE
Filed July 1, 1964
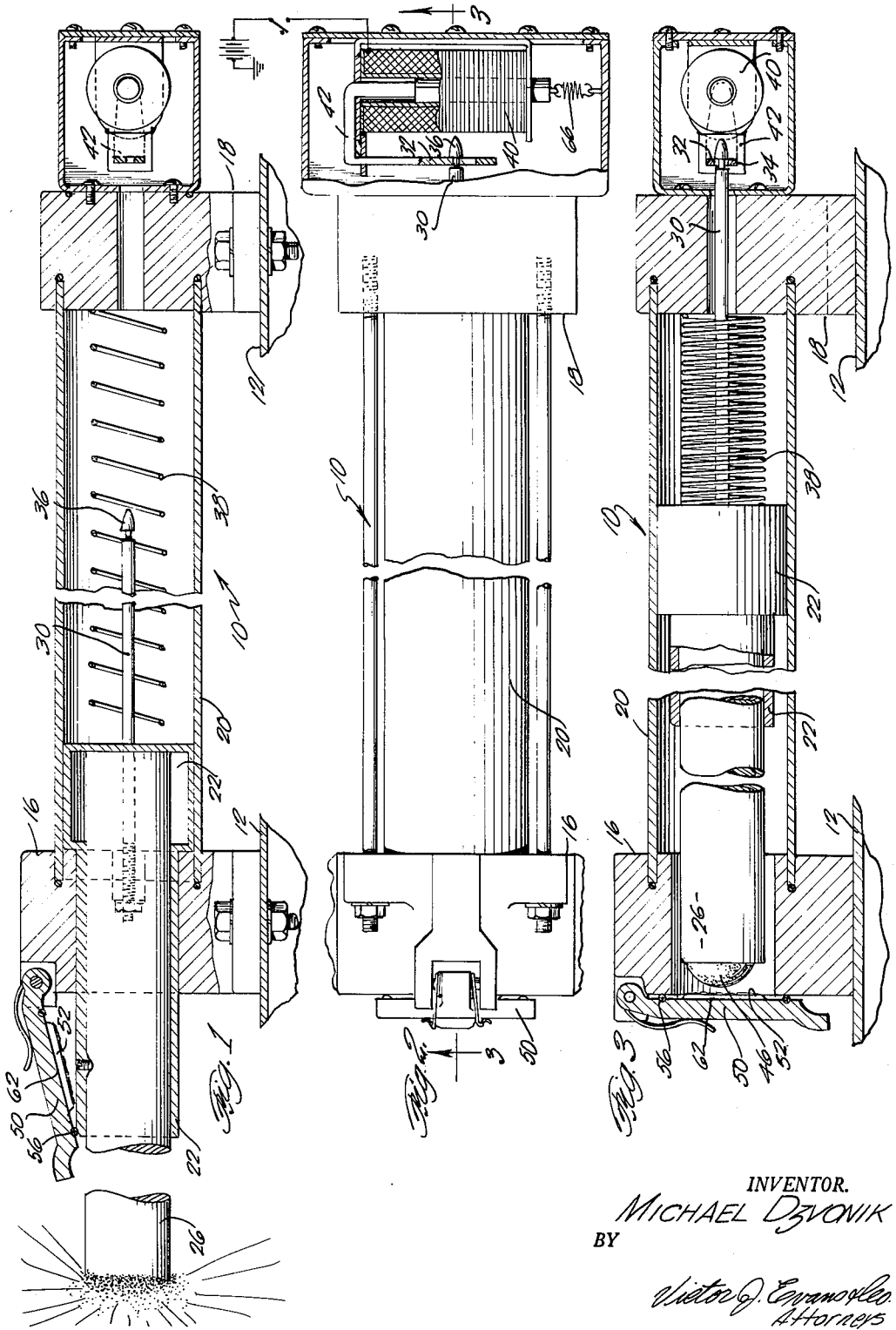
INVENTOR.
MICHAEL DZVONIK
BY

# United States Patent Office 3,224,232
Patented Dec. 21, 1965

3,224,232
INSTANT FLARE DEVICE
Michael Dzvonik, 226 Sherman Ave., Whitaker, Pa.
Filed July 1, 1964, Ser. No. 379,643
4 Claims. (Cl. 67—3)

The invention relates to signal flare apparatus, and more particularly relates to signal flare apparatus used in conjunction with trucks, buses, railroad engines, autos in which the flare may be needed by the operator thereof to signal distress upon depression of a button for actuating a solenoid which in turn releases a spring to extend a flare as a warning device when such vehicles are obliged to stop on or beside a road bed or highway.

Often there arises instances of trouble or emergency in a vehicle at the time of stoppage or parking of the vehicle so that the operator is completely without any immediate and available means for conveying a warning signal prior to the necessary interval during which the operator is able to post necessary flares by manually positioning them about his vehicle. In the present invention there is provided apparatus for avoiding the above contingency and comprises in essence a device for automatically lighting and extending a conventional flare upon and in response to his actuation electrically of a solenoid for releasing a spring loaded plunger that extends the flare upon a pyrophoric substance and is traversed from a cylinder carrying the flare to a signal receiving area adjacent and exterior of the vehicle of the operator.

An object, therefore, of the invention is to provide in a vehicle such as a bus, truck, auto, cab of a railroad engine, and the like, a signal flare-extending apparatus which may be conveniently installed as standard equipment and actuable by a solenoid for releasing a plunger that extends the flare from the apparatus.

Another and further feature and object of the invention is to provide in a motor vehicle a signal flare-extending apparatus that is instantaneously operable to provide a warning signal immediately upon the stoppage of the vehicle and operation by the operator of an electrical solenoid.

A further and additional object of the invention is to provide a signal flare-extending apparatus for motor vehicles using a conventional type of flare, in which the apparatus is easily installed, and is adaptable to incorporation with the controls and system that are already available in the motor vehicle.

A further object of the invention is to provide in a signal flare-extending apparatus means for simultaneously lighting and extending a conventional type of flare upon energization of a conventional solenoid.

A further object of the invention is to provide a signal flare-extending apparatus used in motor vehicles which is operative by remote control from an operator's position even though the flare-extending apparatus may be remotely installed from the driver's or operator's position.

An additional object of the invention is to provide a signal flare-extending apparatus operative by means independent of other mechanisms in the automotive system of the vehicle and other circuits related to the motor vehicle, whereby the signal flare-extending apparatus will be operative regardless of the nature of the failure or other emergency of the vehicle.

A further object of the invention is to provide a signal flare-extending apparatus as easily and as quickly maintained, repaired and operated in its use of conventional type flares.

A further and additional object of the invention is to provide a signal flare-extending apparatus which is adapted for installation as standard equipment in a motor vehicle and is simple in construction, economical in cost, susceptible to preventative maintenance, adaptable for installation in various types of vehicles, and is generally rugged, sturdy and durable over a long period of actual use thereof.

With these and other objects and features of the invention, all of which are more fully hereinafter apparent, the invention comprises certain novel constructions, combinations and arrangements of parts and elements as hereinafter described and defined in the appended claims and illustrated in a preferred embodiment of the invention illustrated in the accompanying drawing in which:

FIGURE 1 is a longitudinal and generally cross-sectional view of a signal flare-extending apparatus in extended and operative position, in accordance with a preferred embodiment of the present invention.

FIGURE 2 is a generally planned or elevational view of the signal flare-extending apparatus in retracted or ready position having a flare inserted in the flare-extending apparatus for ultimate use;

FIGURE 3 is an elevational cross-sectional view taken along lines 3—3 of FIGURE 2 illustrating the retracted position of the flare in the signal flare-extending apparatus showing the features of the preferred embodiment of the invention.

Referring now to the drawings, there is shown signal flare-extending aparatus 10 and suitably mounted upon a wall or panel 12 of a vehicle (not shown). The vehicle may be the cab or other part of a railroad engine, a truck, bus, automobile, boat or the like. The signal flare-extending apparatus 10 is preferably positioned about the vehicle in a remote position from the operator thereof so that the flare as it is extended from the flare-extending apparatus is observable to others remote from the vehicle, and is also such that the flare may be necessarily projected along the highway or road bed in advance or behind the vehicle as may be desired. The positioning of a flare or flares about the vehicle is done in a well known pattern to provide the safety and intelligence of information that the vehicle is in trouble or under condition of emergency. The panel or wall 12 provides necessary support at the front and rear of the signal flare-extending apparatus, and the apparatus may conveniently be provided with a front support 16 and a rear support 18. Between the front and rear supports 16, 18 there is provided a generally cylindrical body 20 having its ends connected adjacent and integral with the front support 16 and rear support 18. Cylindrically and actually disposed within the cylinder body 20, there is interiorly disposed a signal flare-holder 22 that is slidably engaged to the interior walls of the cylinder body 20. The exterior end of the flare holder 22 is capable of extending from the flare-extending apparatus as is shown in FIGURE 1 when a flare 26 is being extended from the apparatus.

On an essentially disposed rear portion of the flare holder 22 is a releasing pin 30 that engages a set mechanism 32 comprising an opening 34 as shown in FIGURES 2 and 3. The opening 34 is capable of receiving the head 36 of the pin 30 so that the head 36 retains the flare holder in retracted position, even though a spring 38 is compressed as shown in FIGURE 3. A solenoid 40 having an armature 42 is provided so that actuation of the armature 42 by the solenoid 40 will disengage the head 36 from the opening 34 and thus release or unset the pin from the set mechanism 32. In this fashion the pin 30 is released, and since the flare holder is thus subject to the compression of spring 38, it will be seen to plunge toward the left of FIGURE 3 to the position seen in FIGURE 1 so that the flare holder 22 carries the flare rapidly to its extended position.

In the process of the flare holder 22 carrying the flare 26 to its extended position, the fuse head 46 may be ignited by striking a pyrophoric material that is mounted on the end side of a spring loaded door 50. The pyrophoric material may be constructed of and comprise a striker cloth material 52 that is sufficient in surface area to provide a resistance or frictional contact with the fuse head 46 as the fuse 26 is being extended from the signal flare-extending apparatus. An O ring 56 is provided on the door to contact with the front support 16 to provide sealing effect and protection for the fuse from the weather and environmental moisture. The flare striker cloth 52 may be provided with an adhesive backing 62 for attaching the cloth to the flare striker door 50.

The solenoid 40 may be conveniently and conventionally connected to a push button actuated switch (not shown) that is connected to a battery source of the vehicle. The battery may be the conventional 12 or 6 volt battery used in such vehicles, or the battery may be an emergency or special use circuit separate from the main battery. The armature 42 of the solenoid is connected and mounted within the solenoid in a conventional manner, and a spring 66 shown in FIGURE 2 is used to maintain the armature in a set or cocked position so that the head 36 is securely retained in the opening of the armature 42 under adverse conditions of vibration or the like, and the pin 30 is only released from the opening in the armature 42 upon actuation of the solenoid 40. In this way the objects and advantages of the invention are achieved in accordance with the signal flare-extending apparatus as has been described. The push button for actuation of the solenoid 40 may be conveniently located in the operator's or driver's position of the vehicle, and whenever the operator desires to set off a flare, he merely actuates the push button to close the circuit and energize the solenoid 40 allowing the pin 30 to be released from its position, while the spring 38 drives the plunger or flare holder 22 along the length of the cylinder body 20, and allowing the flare to proceed to its extended position while the fuse 46 engages the flare striker cloth 52 on the door 50, as has been described above. The flare upon being extended from the apparatus 10 burns further without attention or control of the signal flare-extending apparatus. While there is described here in a specific and preferred embodiment of the invention, other arrangements, alternatives and equivalents, all within the scope and spirit of the invention will occur to those skilled in the art, and the invention is defined in the appended claims hereto.

What is claimed is:

1. A signal-flare projecting apparatus carried by a vehicle having a wall, said apparatus including in combination an elongated cylinder body mounted on said wall, a flare holder slidably mounted within the cylinder body and having a pin extending rearwardly of an axially central position of the flare holder, said pin having a head at the distal end thereof, a solenoid, an armature actuable by energization thereof, said armature having an opening for receiving the head of said pin, and for retaining the head therein until energization of said solenoid, spring means for driving the flare holder when the head of said pin has been released from the opening of said armature to project said flare beyond the signal-flare projecting apparatus, and flare striker cloth mounted for engaging a fuse head of the flare for ignition thereof responsive to the extension of flare from the cylinder body.

2. The apparatus as defined in claim 1 wherein there is further included a hinged closure for the cylinder body, said flare striker cloth being adhesively secured upon the interior side of said hinged closure and adapted to be hit by the fuse head of said flare.

3. The apparatus as defined in claim 1, wherein there is provided cloth of pyrophoric material on a hinged closure for facilitating ignition of the flare upon the flare being extended from said apparatus.

4. A signal flare-extending apparatus adapted for use with a cylindrical flare having percussive frictional responsive igniting head at one end, comprising in combination a generally tubular cylinder body for said signal flare-extending apparatus, a flare holder cylindrically disposed within said cylinder body and for retaining said flare, a pin and head member extending from a central position of said flare holder, a solenoid and armature arrangement for being actuated upon energization thereof by an electrical circuit, said armature having an aperture for receiving said head and retaining the head until energization of said solenoid, and a spring for extending the flare holder for extending the flare from the apparatus upon release of the head from the opening of said armature.

References Cited by the Examiner
UNITED STATES PATENTS

| | | | |
|---|---|---|---|
| 2,751,582 | 6/1956 | Kuykendall | 67—3 |
| 3,146,613 | 9/1964 | Hiner | 67—3 |
| 3,158,099 | 11/1964 | Dzvonik | 102—37.4 |

EDWARD J. MICHAEL, *Primary Examiner.*